(12) United States Patent
Treder

(10) Patent No.: US 8,438,166 B1
(45) Date of Patent: May 7, 2013

(54) PRE-COMPUTED SEARCH RESULTS

(75) Inventor: Douglas M. Treder, Shoreline, WA (US)

(73) Assignee: Amazon Technologies, Inc., Reno, NV (US)

(*) Notice: Subject to any disclaimer, the term of this patent is extended or adjusted under 35 U.S.C. 154(b) by 212 days.

(21) Appl. No.: 13/076,484

(22) Filed: Mar. 31, 2011

(51) Int. Cl.
*G06F 7/00* (2006.01)
*G06F 17/30* (2006.01)

(52) U.S. Cl.
USPC .......................................................... 707/741

(58) Field of Classification Search .................. None
See application file for complete search history.

(56) References Cited

U.S. PATENT DOCUMENTS

2012/0106733 A1* 5/2012 Falch et al. ..................... 380/46

* cited by examiner

*Primary Examiner* — Jason Liao
(74) *Attorney, Agent, or Firm* — Thomas|Horstemeyer, LLP

(57) ABSTRACT

Disclosed are various embodiments for pre-computing search results. A series of characters is captured as the characters are entered by a user into a search query form. The series forms a successive plurality of input strings. As each character in the series is entered into the search query form, a successive plurality of search query strings is generated. Each search query string corresponds to one of the input strings. As each search query string is generated, a request is sent to retrieve a search results document corresponding to the search query string. As a response to each request is received, at least a portion of the search results document is displayed if the response indicates success.

20 Claims, 11 Drawing Sheets

PRE-COMPUTED SEARCH RESULTS

BACKGROUND

Online users interact with search engines to find information of interest, and to obtain more detail about the information of interest. A search engine returns summary information for search results that most closely match a user's search query. The user then selects a link associated with one of the search results to get more information about the search results.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to systems and methods for pre-computing search results for a content database. A collection of search results documents is built that represents all possible search query strings of length 1 to N (e.g., "a," "aa," "ab," "ac," etc.). Each of the search results documents represents the results from a different search query. Furthermore, the name of each search results document encodes the search query. Thus, on receiving a search query from a user, the matching search results document can be easily located and retrieved rather than generated on the fly. Because all possible queries have been indexed ahead of time, partial search queries as short as a single character can be supported. For example, upon typing the letter "h" into a search query form, the user can be presented with the items in the content database that start with "h." The list presented to the user may be limited to a predetermined number, such as the ten most popular items. As the user types more characters, search results for these longer search query strings can be retrieved and presented to the user, replacing the search results produced by the shorter strings. The search results document collection can be distributed to a content distribution network so that retrieval of the search results document corresponding to the search query string can be handled by a computing device which is geographically proximal to the user, thus reducing latency even more. In the following discussion, a general description of the system and its components is provided, followed by a discussion of the operation of the same.

Figure 1:
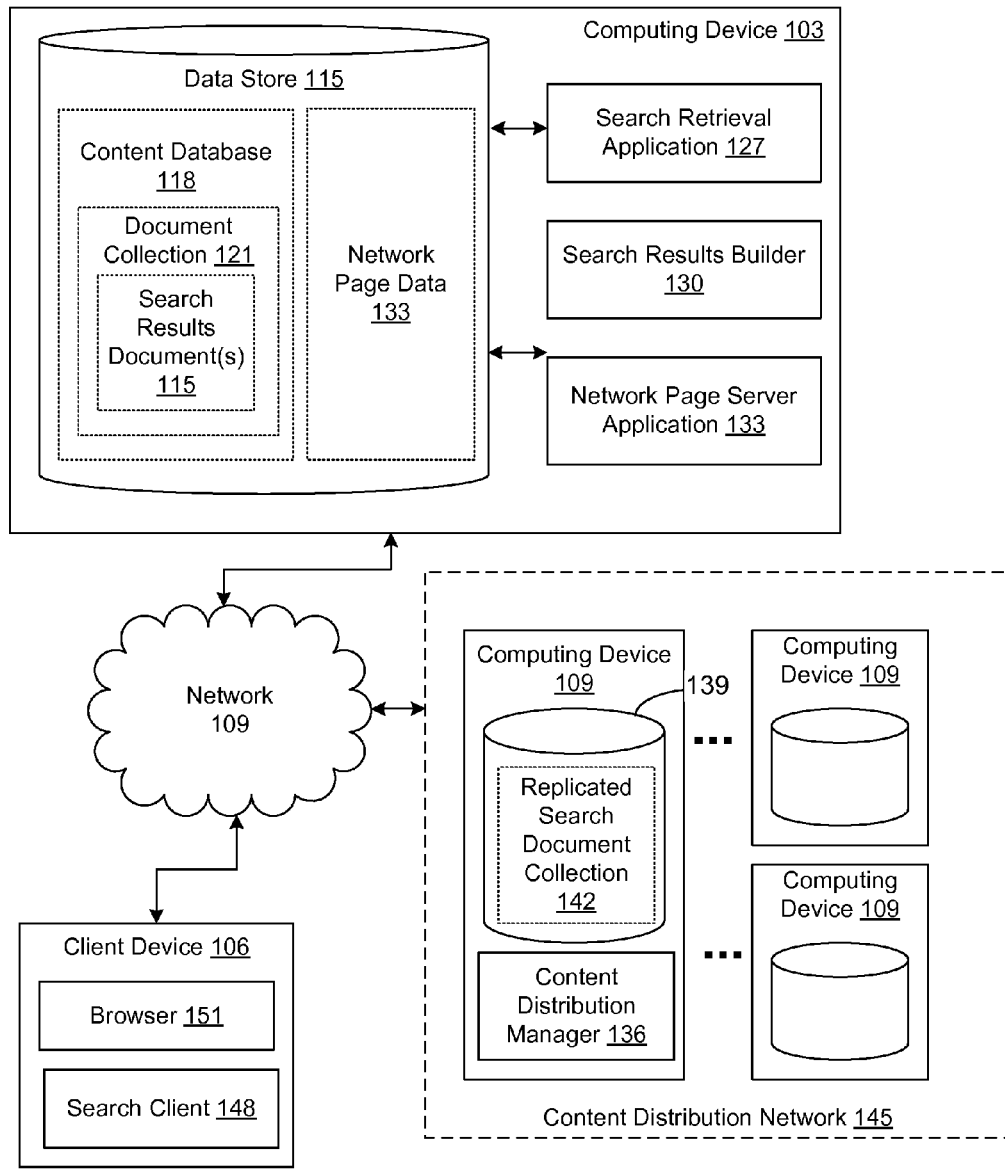
FIG. 1 is a drawing of a networked environment according to one embodiment of the disclosure.

With reference to FIG. 1, shown is a networked environment 100 according to various embodiments. The networked environment 100 includes one or more computing devices 103 in data communication with one or more client devices 106 by way of a network 109. The computing device 103 is also in data communication with one or more computing devices 112 by way of the network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115 includes data accessed by the components executing on the computing device 103, for example, a content database 118 and a collection 121 of search result documents 124, as well as potentially other data.

The components executed on the computing device 103 include, for example, a search retrieval application 127, a search results builder 130, and a network page server application 133. The components executed on the computing device 103 may also include other applications, services, processes, systems, engines, or functionality not discussed in detail herein. These components may communicate with each other using various mechanisms, including but not limited to any type of middleware framework. Examples of such frameworks include remote procedure calls, simple object access protocol (SOAP), representational state transfer (REST), Windows Communication Foundation, and other frameworks. Though shown as logically separate components, the functionality of these components can be combined and/or distributed in various ways, as can be appreciated.

The content database 118 stores records, where each record includes one or more fields, also known as attributes. One or more of these fields is designated as a key. A search for a key having a particular value retrieves one or more records in the content database 118 where that key attribute matches the key value. The records can be sorted on one or more fields. In some embodiments, the content database 118 stores arbitrary key/data pairs as byte arrays, and supports multiple data items for a single key. Some embodiments of the byte array database support various access methods, such as binary-plus-tree, hashing, fixed-length records, and/or variable-length records. An example byte array database is implemented using Berkeley DB. In some embodiments, the content database 118 is implemented as a trie, also known as a prefix tree.

The search results builder 130 is executed to build a search results document collection 121 from the content database 118. The search results document collection 121 represents all possible search results using all possible strings as keys. All possible strings includes a complete set of strings, using the entire character set, ranging from size 1 to size N. That is, the search results document collection 121 includes a set of documents representing results for all single character keys ("a," "b," "c,", etc.); another set of documents representing results for all combinations of 2-character keys ("aa," "ab," "ac," etc.); another set of documents representing results for all combinations of 3-characters keys ("aaa," "aab," "aac," etc.); and so on. The path and/or name of each search result documents 124 reflects the key. That is, the search results document 124 representing records which match the key "abc" has a name which includes "abc."

The search retrieval application 127 is executed to receive a search query string and, in response, to retrieve one of the previously generated documents in the search results document collection 121 built by the search results builder 130. The search results document 124 that is retrieved in response to the query is the one having a name that matches the search query. Because the search results builder 130 builds, a priori, a collection of static documents having names related to search queries, the process of searching by a search query string can be replaced by the process of retrieving a document having a name formed by the search query string. In this manner, the search retrieval application 127 responds to search queries not by performing a search in real time, but instead by locating a previously generated document that already contains the requested search results.

The network page server application 133 is executed to receive requests for network pages generated by a client device 106 and received over the network 109. The network page server application 133 is further executed to generate a network page corresponding to the network page request and to serve up the generated network page. The network pages fetched by the network page server application 133 may be dynamically generated or may be static. To this end, the network page server application 133 uses network page data 134, which may include any type of data related to the generation of network pages. Such data may include, for example, templates, executable code, interpreted code, hypertext markup language (HTML), extensible markup language (XML), images, video, text, graphics, and any other type of data that may be used in network pages. The network page server application 133 may comprise a hypertext transfer protocol (HTTP) server such as Apache® HTTP Server, Apache® Tomcat®, Microsoft® Internet Information Services (IIS), and/or any other type of network page server application.

The components executed on the computing devices 112 include, for example, a content distribution manager 136, as well as other applications and/or functionality. Each of the computing devices 112 includes a data store 139, which may be representative of a plurality of data stores as can be appreciated, that is accessible to the content distribution manager 136. The computing devices 112 may be distributed geographically so as to be relatively near various client devices 106.

The data stored in the data store 139 includes, for example, a replicated search document collection 142, as well as potentially other data. The replicated search document collection 142 is a copy of the search results document collection 121. The content distribution manager 136 is executed on one or more of the computing devices 112 to distribute the replicated search document collection 142 to each of the computing device 112. The computing devices 112 can be viewed as forming a content distribution network 145, in which client requests to retrieve a search document are directed to and handled by a computing device 112 that is located relatively near the client device 106 in order to reduce latency.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a search client 148, a browser 151, and other applications. The browser 151 may be executed in a client device 106, for example, to access and render network pages, such as web pages, or other network content served up by the network page server application 133. For example, the browser 151 may be used to interact with the search retrieval application 127. The client device 106 may be configured to execute applications beyond browser 151 such as, for example, email applications, instant message applications, and/or other applications.

Next, a general description of the operation of the various components of the networked environment 100 is provided. To begin, the search results builder 130 creates the search results document collection 121. The search results document collection 121 represents all possible search results, from the content database 118. The search results document collection 121 is created by executing all possible searches and creating a different document for each set of search results. Thus, the search results builder 130 performs a search using the search query "a," which produces a corresponding document "a" that includes information about all entries in the content database 118 that start with "a." Similarly, the search results builder 130 uses the search query string "ab" to produce a document "ab" that includes information about all entries that start with "ab." The search results builder 130 iterates in this manner until all search query strings up to a predetermined length have been generated and processed to produce search result documents 124 for all search query strings.

A search results document 124 includes at least summary information. For example, if the content database 118 is a movie database, the summary information may include fields such as title, actor(s), year of release, and an image. The search results builder 130 may periodically rebuild a new search results document collection 121.

Once the search results document collection 121 is built, a user interacts with the search client 148 to enter characters in a search string. As each character is entered by the user, the search client 148 builds a corresponding search query string and uses the search query string to retrieve a document from the search retrieval application 127. In this manner, rather than performing a search in real time, the search retrieval application 127 instead retrieves search results that were pre-computed by the search results builder 130 and stored in a single static document. If the search query string produces no search results at all (no match), then the search retrieval application 127 returns an error code.

When another character is entered, the search client 148 appends the new character to the old search query string and issues another search query to the search retrieval application 127, using the longer string. The search client 148 presents the incremental search results to the user as each document is retrieved. In some embodiments, the search query string takes the form of a Uniform Resource Locator (URL), and the retrieved document takes the form of a JavaScript Object Notation (JSON) file.

If the search produces no results, then the search retrieval application 127 returns an error code. Some embodiments of the search client 148 continue to display the previous set of results upon receiving the error code rather than displaying a results list with no items.

FIGS. 2A-F illustrate examples of a user interface displayed by the search client 148 (FIG. 1) executing in the client device 106 (FIG. 1) in the networked environment 100 (FIG. 1). The user interfaces are denoted herein as 200a, 200b, 200c, 200d, 200e, and 200f. In some embodiments, the user interfaces 200a, 200b, and 200c are implemented as network pages, rendered by a browser 151 (FIG. 1) executing in client device 106 in the networked environment 100. In some embodiments, the user interfaces 200a-200f are generated by an application executing on the client device 106, which may be an application other than the search client 148.

Figure 2A:
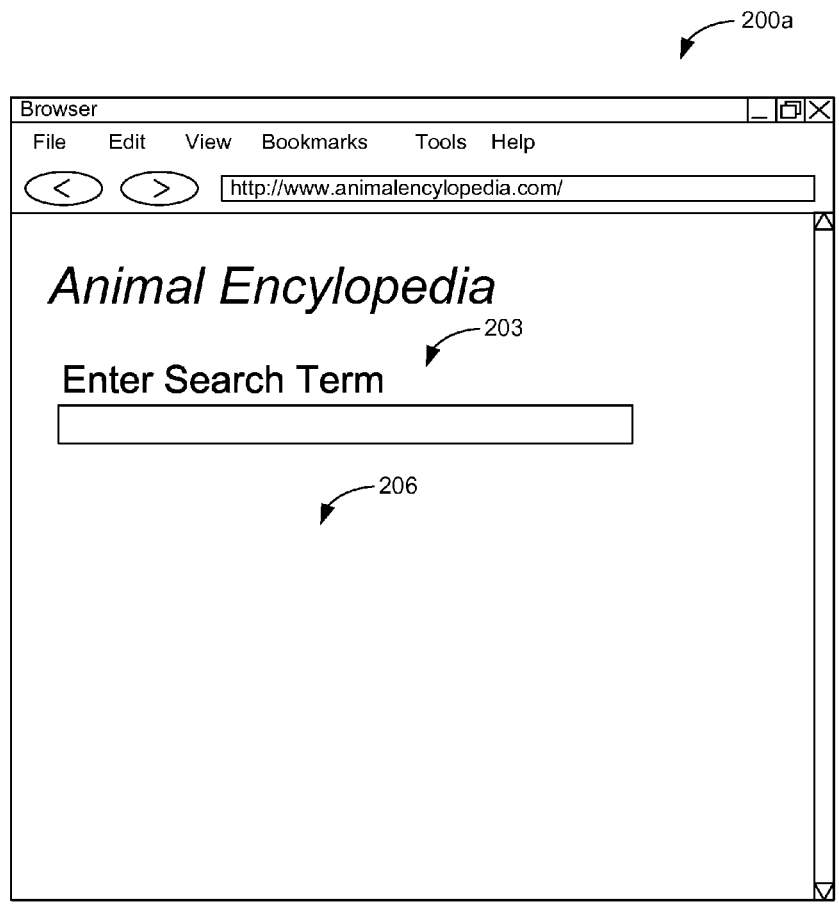
FIGS. 2A-2F are drawings of examples of user interfaces used in the networked environment of FIG. 1 according to various embodiments of the present disclosure.

Referring to FIG. 2A, the user interface screen 200a includes a search term input field 203 and a search results list 206. As the user types into the search term input field 203, search results are displayed in the search results list 206. The user interface 200a represents the view seen by the user before any text is entered into the search term input field 203, so the search results list 206 is empty.

Figure 2B:
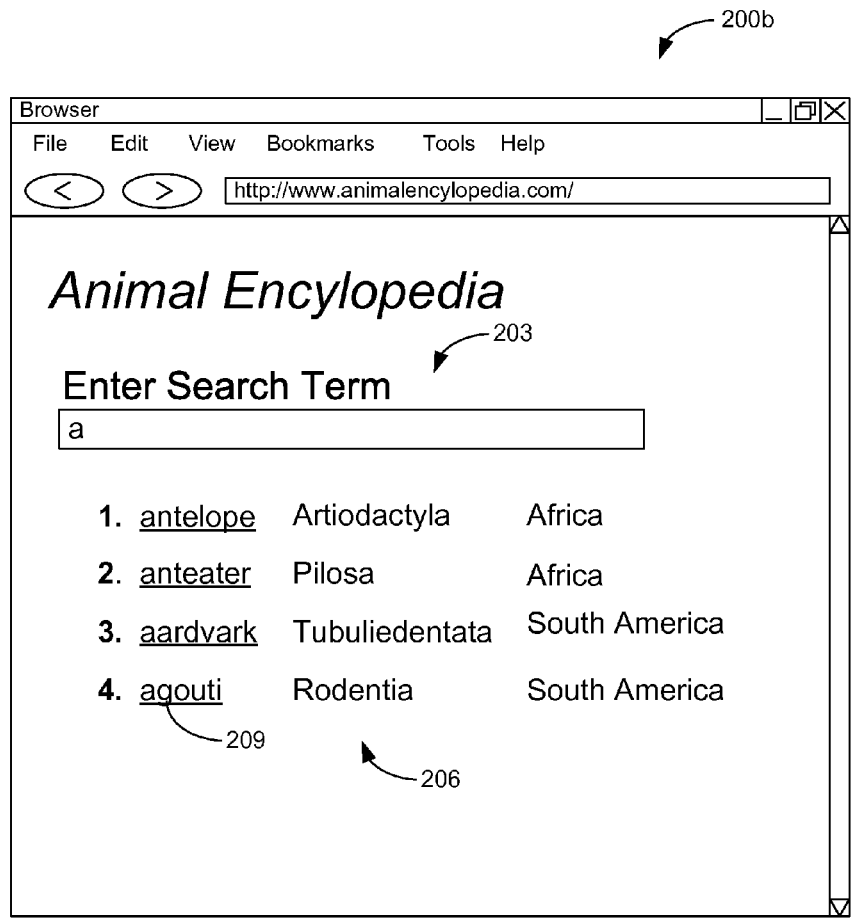

Moving on to FIG. 2B, shown is the user interface screen 200b which is provided by the search client 148 when the user types the single character "a" into the search term input field 203. Entry of this first character causes the search client 148 to generate a search query string including the text provided by the user ("a") and to send this search query string to the search retrieval application 127 (FIG. 1). In response, the search retrieval application 127 returns the document in the search results document collection 121 (FIG. 1) which has a name that matches the search query.

In this example scenario, the content database 118 is a database of animals containing four entries for animals starting with the letter "a." Thus, the retrieved search results document 124 includes information about these four entries, which is shown by the search client 148 in the search results list 206. An individual search result may include summary information describing the search result. An individual search result may include one or more links 209 which point to a network page that includes more detailed information on the search result. The search results may be ranked by popularity. Popularity may be measured, for example, by the number of detail page views for a particular search result.

Figure 2C:
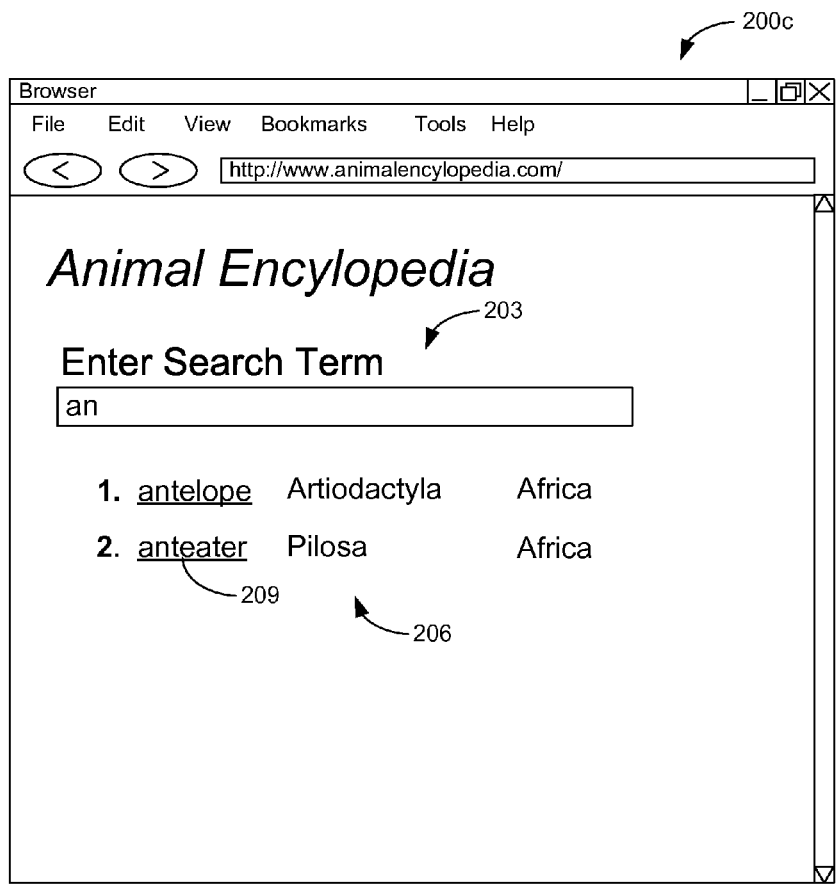

Turning now to FIG. 2C, shown is the user interface screen 200c which is provided by the search client 148 when the user types in the additional character "n" into the search term input field 203. Entry of this second character causes the search client 148 to generate another search query string: "an." This search query string is formed by appending the new character ("n") to the original text provided by the user ("a"). The search query string is sent to the search retrieval application 127. In response, the search retrieval application 127 returns the document in the search results document collection 121 which has a name that matches the search query ("an").

In this example scenario, the content database 118 is a database of animals containing two entries for animals starting with the letters "an." Thus, the retrieved search results document 124 includes information about these two entries, which is shown by the search client 148 in the search results list 206.

Figure 2D:
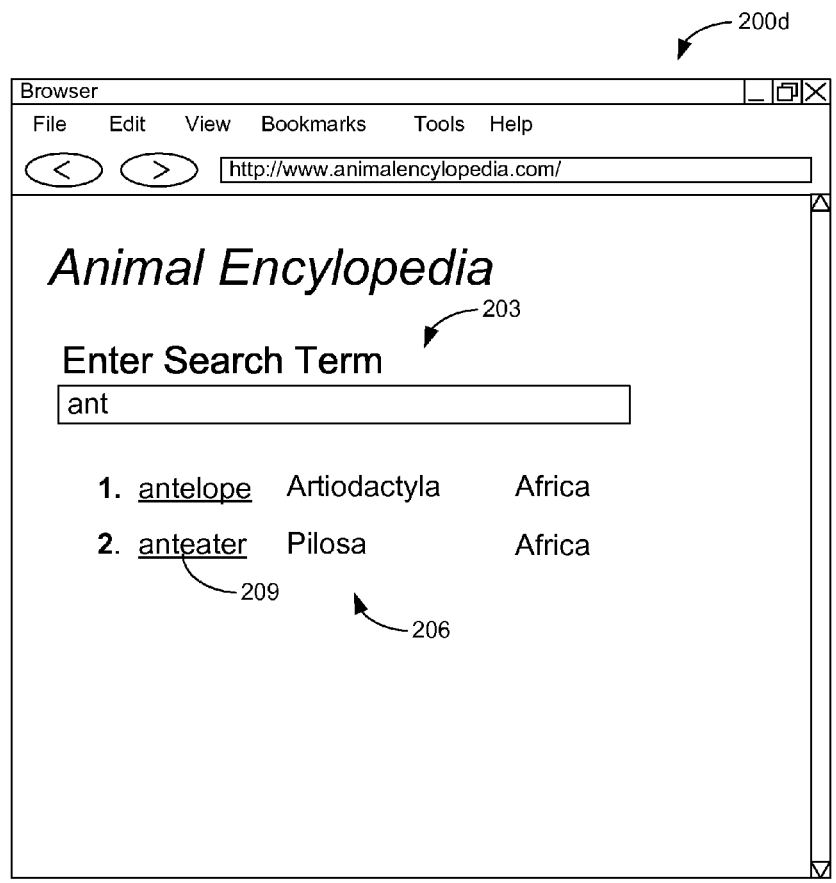

With reference now to FIG. 2D, shown is another user interface screen 200d which is provided by the search client 148 when the user types the next character "t" into the search term input field 203, following the characters "an" which were typed earlier. Entry of the additional character causes the search client 148 to generate another search query string: "ant." This search query string is formed by appending the new character ("t") to the text previously provided by the user ("an"). This search query string is sent to the search retrieval application 127. In response, the search retrieval application 127 returns the document in the search results document collection 121 which has a name that matches the search query ("ant").

In this example scenario, the content database 118 is a database of animals containing two entries for animals starting with the letters "ant." Thus, the retrieved search results document 124 includes information about these two entries, which is shown by the search client 148 in the search results list 206. In this particular example, the additional letter "t" did not change the search results from those produced earlier for "an."

Figure 2E:
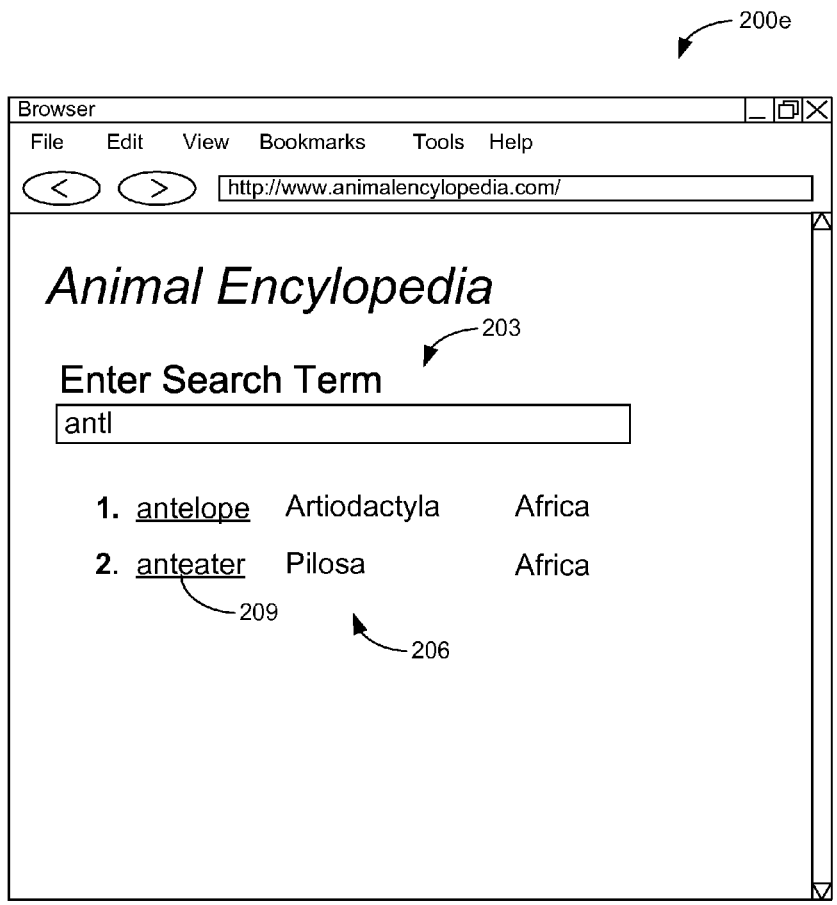

Moving on to FIG. 2E, shown is the user interface screen 200e which is provided by the search client 148 when the user types the next character "I" into the search term input field 203. Entry of this new character causes the search client 148 to generate another search query string: "anti." This search query string is formed by appending the new character ("I") to the text previously provided by the user ("ant"). The search query string is sent to the search retrieval application 127. In response, the search retrieval application 127 returns an error code, since no document in the search results document collection 121 has a name that matches the search query ("anti"). The search results list 206 remains unchanged, and so displays the two animals from the earlier search ("antelope") and ("anteater"). Some embodiments of the search client 148 may highlight, in the search term input field 203, the character that produced no search results, which provides the user with a visual indication that the current search term may contain a misspelling.

Figure 2F:
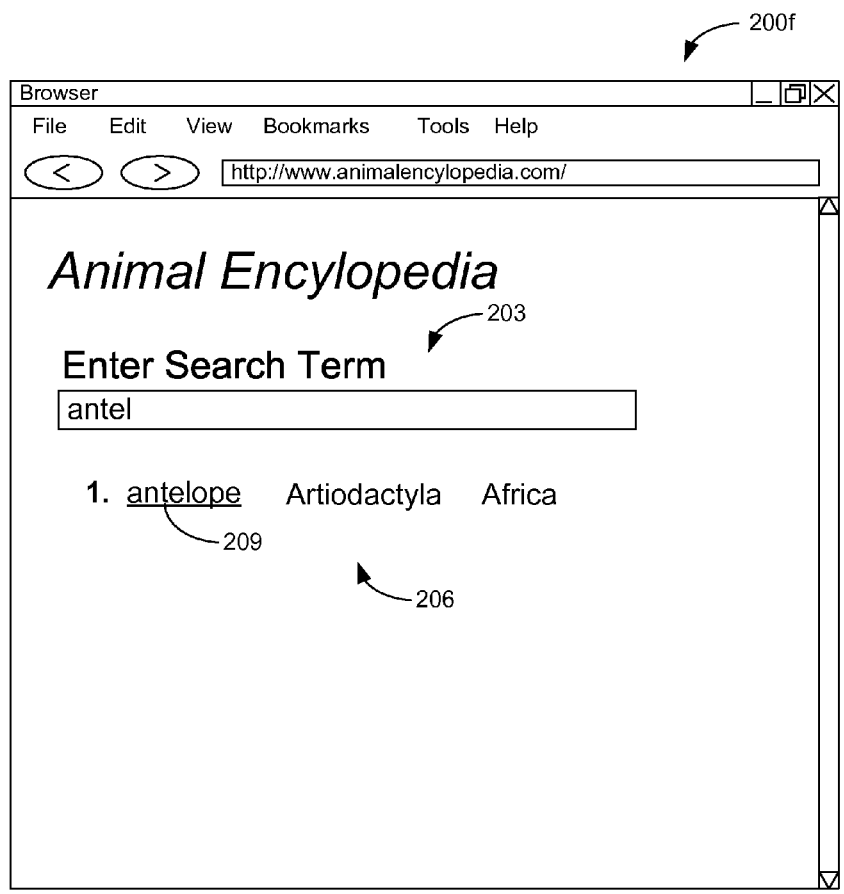

Turning now to FIG. 2F, shown is the user interface 200f which is provided by the search client 148 after the user takes the following actions: the user deletes the "I"; the user enters "e"; and the user enters "l." The user interface does not change as a result of the deletion of "l," since the deletion results in the string "ant" which was already searched. Nor does the user interface change as a result of the addition of "e," since the search results document 124 retrieved using the search string "ante" contains the same information as the search results document 124 retrieved using "ant."

However, the second occurrence of "l," after "e," does change the search results, as follows. Entry of the second "l" causes the search client 148 to generate another search query string: "antel" and send it to the search retrieval application 127. In response, the search retrieval application 127 returns the document in the search results document collection 121 which has a name that matches the search query ("antel"). In this example scenario, the content database 118 is a database of animals containing a single entry for animals starting with the letters "antel." Thus, the retrieved search results document 124 includes information for this entry, which is shown by the search client 148 in the search results list 206.

Figure 3:
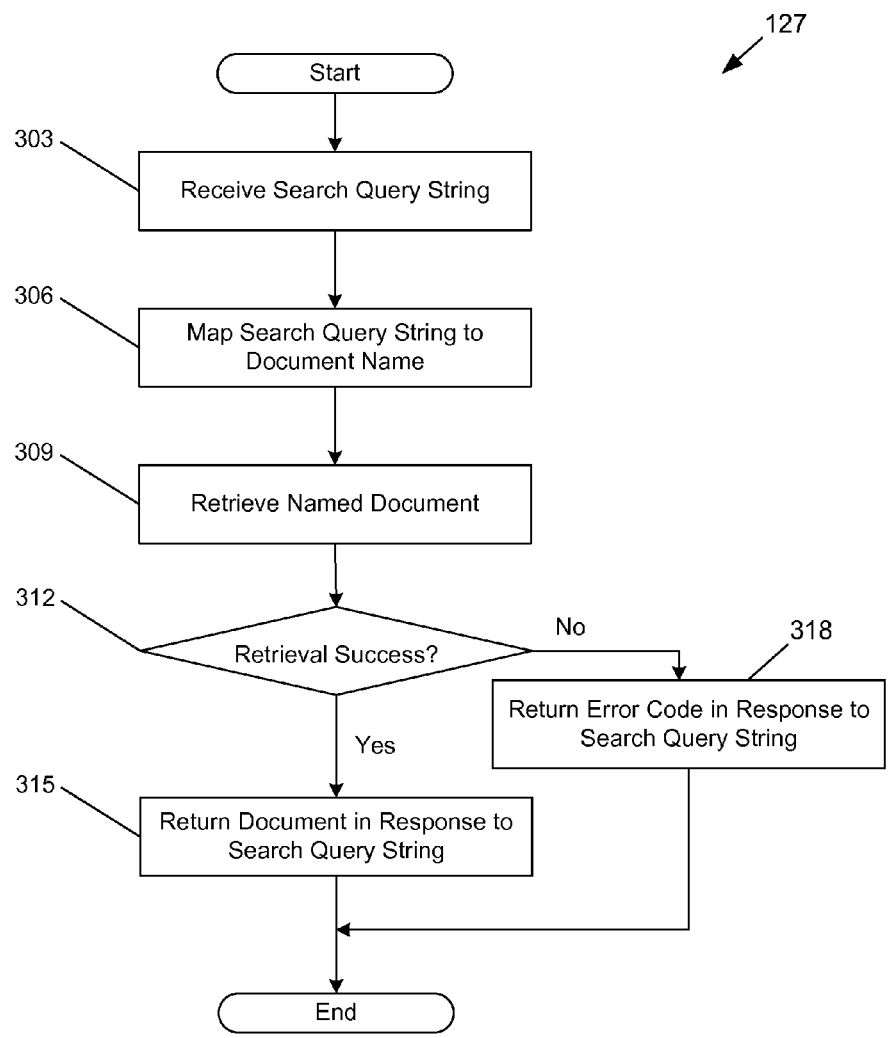
FIG. 3 is a flowchart illustrating an example of functionality implemented as portions of a search client application executed in a computing device in the networked environment of FIG. 1 according to various embodiments of the present disclosure.

With reference now to FIG. 3, shown is a flowchart that provides one example of the operation of a portion of the search retrieval application 127 (FIG. 1) according to various embodiments. It is understood that the flowchart of FIG. 3 provides merely an example of the many different types of functional arrangements that may be employed to implement the operation of the portion of the search retrieval application 127 as described herein. As an alternative, the flowchart of FIG. 3 may be viewed as depicting an example of steps of a method implemented in the computing device 103 (FIG. 1) according to one or more embodiments.

To begin, at box 303 the search retrieval application 127 receives a search query string from a search client 148 (FIG. 1). The search retrieval application 127 fulfills this search request from already existing search results document 124 (FIG. 1) in search results document collection 121 (FIG. 1), as follows. Using a priori knowledge of the format for the search query string, at box 306 the search retrieval application 127 maps the search query string to the name of a search results document 124. The mapping may involve, for example, stripping off or a predetermined leading or trailing portion of the string. For example, the prefix "http://" may be removed from the search query string "http://sg.media.com/suggests/aar," and the file extension ".JSON" added, to produce the document name "sg.media.com/suggests/aar.json." The mapping may also involve extracting a predefined portion of the search query string and inserting the extracted portion elsewhere in the document name. For example, a directory location ("a") may be obtained from the first character of the filename portion of the search query string ("aar"), and that directory location inserted to produce a fully qualified document name ("sg.media.com/suggests/a/aar.json"). In some embodiments, the name is not an exact match of the entire document name but is instead a match on part of the document name. For example, the fully qualified document name ""a/amelie_p" may match the search string "amelie_p." Thus, the search retrieval application 127 may ignore some predefined portion of the search query string when mapping to a search results document name.

Next, at box 309 the search retrieval application 127 retrieves the document having the name obtained at box 306. In some embodiments, the document is retrieved from the data store 115 (FIG. 1) that is locally accessible to the computing device 103. However, as described above, in some embodiments the search results document collection 121 is replicated to a replicated search document collection 142 (FIG. 1) within a content distribution network 145 (FIG. 1). In such embodiments, the search retrieval application 127 may cause the search request to be fulfilled from the corresponding document in the replicated search document collection 142 so as to reduce the response time.

At box 312, the search retrieval application 127 determines whether the retrieval at box 309 was successful. If a document was successfully retrieved at box 309, then the search retrieval application 127 continues at box 315, where the document is returned to the search client 148 in response to the request at box 303. If no document having the name obtained at box then the search retrieval application 127 continues at box 318, where an error code is returned to the search client 148 in response to the request at box 303. The mapping and retrieval described above thus operates to locate a search results document 124 that matches the search query string, or to notify the search client 148 that no match exists.

Figure 4:
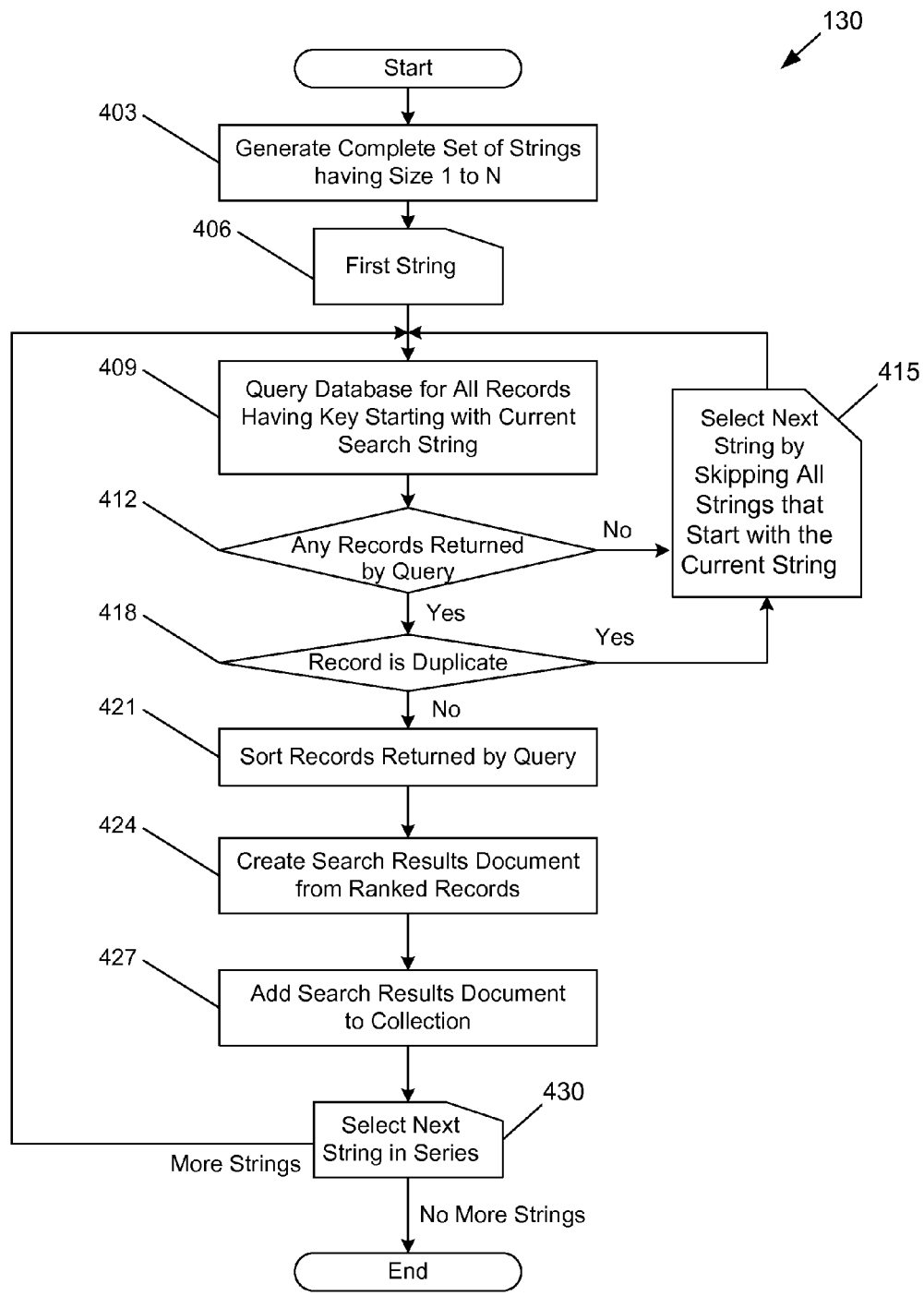
FIG. 4 is a flowchart illustrating an example of functionality implemented as portions of a search retrieval application executed in a computing device in the networked environment of FIG. 1 according to various embodiments of the present disclosure.

Moving on to FIG. 4, shown is a flowchart that provides one example of the operation of a portion of the search results builder 130 (FIG. 1) according to various embodiments. It is understood that the flowchart of FIG. 4 provides merely an example of the many different types of functional arrangements that may be employed to implement the operation of the portion of the search results builder 130 as described herein. As an alternative, the flowchart of FIG. 4 may be viewed as depicting an example of steps of a method implemented in the computing device 103 (FIG. 1) according to one or more embodiments.

To begin, at box 403 the search results builder 130 generates a complete set of all the strings from 1 character to N characters, using a specific character set. The character set may, for example, include alphabetic characters, numeric characters, symbol characters, and/or combinations thereof. Thus, if the character set includes digits only and N is 3, the complete set of all digit strings from size 1 to 3 is: the 1-character strings "0," "1," "2," . . . "9"; the 2-character strings "00," "01," . . . "98," and "99"; and the 3-character strings "000," "001," . . . "998," and "999." In some embodiments, the string generation at box 403 is performed recursively.

The search results builder 130 then uses each of these strings in a search query of the content database 118 (FIG. 1). Box 406 begins an iteration loop by setting the iterator or current string to the first string in the complete set generated at box 403. Next, at box 409, the search results builder 130 queries the content database 118 for all records having a key beginning with the current string. In some embodiments, the query takes the form of a range query using a binary tree accessor with duplicate keys. Each query in box 409 produces a set of one or more records in the content database 118 that match the key.

At box 412, the search results builder 130 determines whether the record set returned by the query at box 409 includes any records. If the record set is empty, then processing continues at box 415. At box 415, the search results builder 130 chooses the next string in the complete set of strings for use in a query, which has the effect of pruning the search tree by abandoning the current path of descent through the tree. Since the query failed, all longer strings starting with the current string will fail also. That is, if the query for "qux" failed, it is axiomatic that the query for "quxa" will fail, as will the query for "quxaa", and the query for "quxb," and so on. Therefore, at box 415, the search results builder 130 skips over all strings starting with the current string when selecting the string for the next search query. Using the previous example, the string chosen at box 415 is "quy." Having moved on to another string, the search results builder 130 then continues processing at box 409, where another query is performed, this time using the selected string.

If, however, the search results builder 130 determines at box 412 that the query returned one or more records, then processing continues at box 418. At box 418, the search results builder 130 determines whether the record(s) returned by the query is a duplicate of any other record. If a duplicate is found, processing continues at box 415, where the search results builder 130 chooses the next string in the complete set of strings for use in a query. The effect of this de-duplication technique is to reduce the size of the final search content database 118.

If at box 418 it is determined that the record is not a duplicate, processing continues at box 421. At box 421, the search results builder 130 ranks or sorts the record set by a particular field. Next, at box 424 the search results builder 130 creates a search results document 124 (FIG. 1) including one or more fields from those records having a ranking above a predefined threshold. For example, if the content database 118 includes movies, then the fields may include title, actors, and year of release. A single search results document 124 includes the selected fields for multiple records returned by the query at box 409, limiting by the ranking threshold. Thus, if the query returned twenty movies having a key starting with "harry," and the ranking threshold is ten, then the single search results document 124 created at box 424 includes the title, actors, and year of release for the top ten movies having a key starting with "harry." The search results document 124 created by the content database 118 uses a structured data format. In some embodiments, the search results document 124 uses JavaScript Object Notation (JSON) format. In some embodiments, the search results document 124 uses the eXtensible Markup Language (XML) format.

Having created a search results document 124 from the search query results, at box 427, the search results builder 130 adds the search results document 124 to the search results document collection 121. The name and/or path of the search results document 124 is related to the key which produced the search results. A predetermined leading portion, such as a directory path, and/or a predetermined trailing portion, such as a file extension, may be added to the search query to produce the document name.

The search results builder 130 continues processing at box 430, where the search results builder 130 moves to the next or successive string in the complete set of strings generated at box 403. The next string is the string with the next character in the same position, or, if the current character is already the last in the series (e.g., "z," or "9"), then the next string is the string with the first character in the next position (e.g. the string after "ab0" is "ab0a"). When box 430 determines that no more strings remain, the process of FIG. 4 is complete.

The embodiment of FIG. 4 was discussed in terms of generating a complete set of strings and then issuing a succession of search queries by iterating through the strings. In another embodiment, search queries are instead issued as strings are generated, which reduces the amount of storage needed for the strings. In either embodiment, the process can be viewed as traversing a search tree and pruning the tree using one or more techniques such as those described above.

Figure 5:
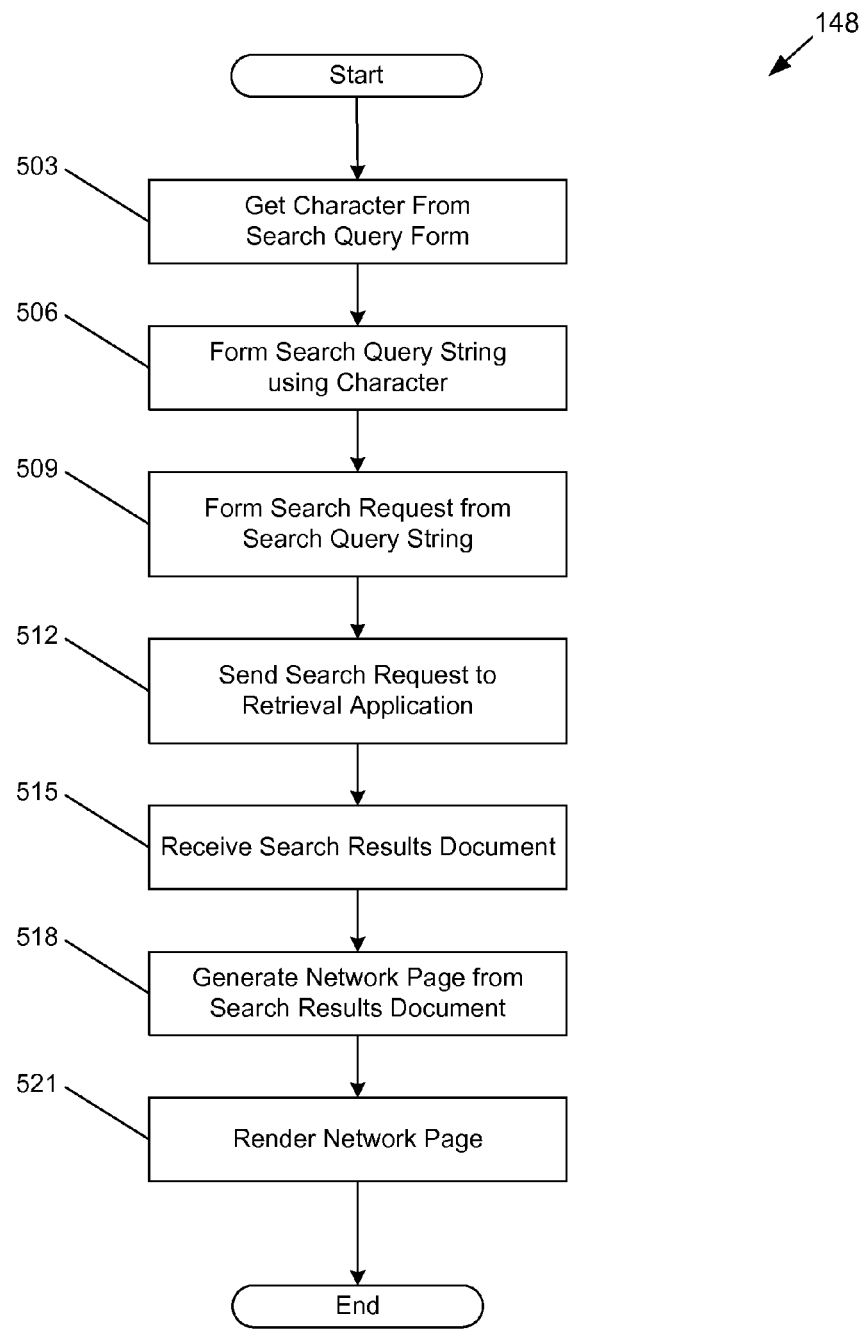
FIG. 5 is a flowchart illustrating an example of functionality implemented as portions of a search results builder application executed in a computing device in the networked environment of FIG. 1 according to various embodiments of the present disclosure.

Turning now to FIG. 5, shown is a flowchart that provides one example of the operation of a portion of the search client 148 (FIG. 1) according to various embodiments. It is understood that the flowchart of FIG. 5 provides merely an example of the many different types of functional arrangements that may be employed to implement the operation of the portion of the search client 148 as described herein. As an alternative, the flowchart of FIG. 5 may be viewed as depicting an example of steps of a method implemented in the client device 106 (FIG. 1) according to one or more embodiments.

To begin, at box 503, the search client 148 obtains a character entered by a user into a search query form on a network page. Next, at box 506 the search client 148 forms a search query string by adding the new character to the end of the last search query string, taking into account any characters deleted by the user. The string formation at box 506 may also include canonicalization according to predefined rules. For example, leading spaces may be removed, case may be changed, special characters may be converted to ASCII, spaces may be converted to an underscore, etc.

At box 509, a search request is formed by prepending a uniform resource locator (URL) to the search query string. Formation of the search request may also include adding directory or path information obtained from the search query string. For example, the first letter of the search query string may be used as a directory. The search request formation at box 509 may also involve adding a country-code path, based on the configuration of browser 151 and/or search client 148. For example, a configuration for French users may insert the country code string "FR" to produce "http://sg.media-imdb.com/suggests/FR/a/ameliejson."

At box 512, the search client 148 sends the search request generated at box 509 to the search retrieval application 127 (FIG. 1). Next, at box 515, the search client 148 receives a search results document 124 (FIG. 1) in response to the search request. At box 518, the search client 148 generates a network page that includes information contained in the search results document 124. To this end, the search client 148 may parse the information in the search results document 124, extract particular fields, and include these fields on the network page. Next, at box 521 the search client 148 renders for display to a user the generated network page.

The process of FIG. 5 repeats as the user enters additional characters into the search query form. In this manner, as each character is entered, the search client 148 generates a succession of search query strings and sends the query strings to the search retrieval application 127. Then, as each search results document is received in response to a search query string, the search client 148 renders for display information in the search results document. The user thus sees search results that are updated each time a character is entered into the search query form. Because the search results are pre-computed as described above, the user perceives relatively little latency between typing a character and seeing search results.

In some embodiments, if at box 515, the search client 148 receives an error indication rather than a search results document 124, the search client 148 does not update the search results displayed to the user, and does not display an error indication to the user. Instead, the error indication from the search retrieval application 127 is treated as an indication that the search results for the last search query string are the same as the search results from the previous search query string. In other words, an error indication for the last search query string "ante" indicates that the search results for the next-to-last-search query string "ant." In such a case, the search client 148 does not change the search results for the search query string which returned the error indication. Thus, the user continues to see results for "ant" even after typing "ante," which conveys to the user that no new search results have been produced by typing in the additional character.

Figure 6:
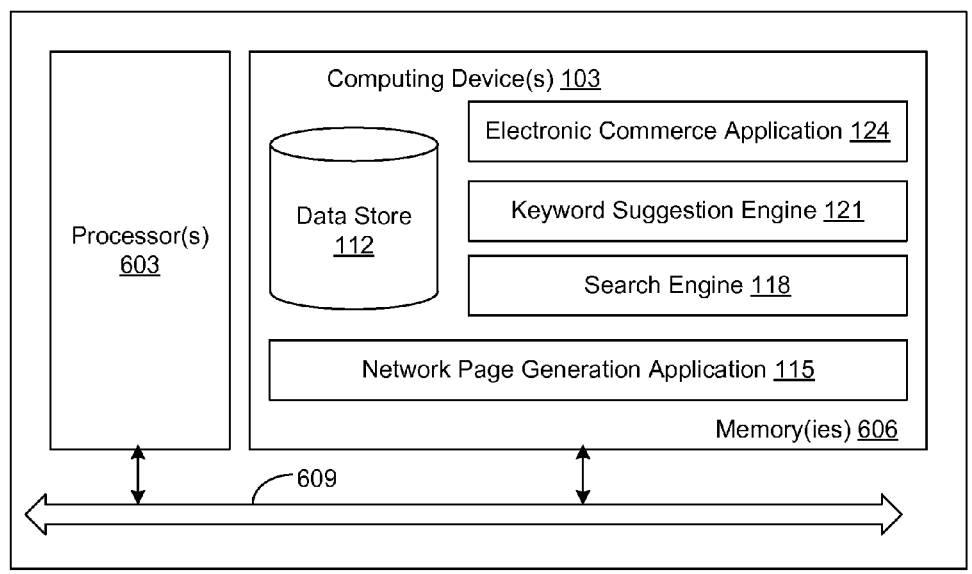
FIG. 6 is a schematic block diagram that provides one example illustration of a computing device employed in the networked environment of FIG. 1 according to various embodiments of the present disclosure.

Referring now to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the search retrieval application 127, the search results builder 130, the network page server application 133, and potentially other applications. Also stored in the memory 606 may be a data store 115 and other data. In addition, an operating system may be stored in the memory 606 and executable by the processor 603. While not illustrated, the client device 106 also includes components like those shown in FIG. 6, whereby the search client 148 and the browser 151 are stored in a memory and executable by a processor.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors and the memory 606 may represent multiple memories that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the search retrieval application 127, the search results builder 130, the search client 148, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 4, and 5 show the functionality and operation of an implementation of portions of the applications described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the FIGS. 3, 4, and 5 show a specific order of execution, it is understood that the order of execution may differ from that which is depicted. For example, the order of execution of two or more blocks may be scrambled relative to the order shown. Also, two or more blocks shown in succession in flowchart of FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search retrieval application 127, the search results builder 130, the search client 148, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   search indexer code implemented in the at least one computing device, the search indexer code comprising:
      logic that generates a complete set of all strings, ranging from a string size of one to a predetermined maximum string size, having a plurality of characters limited to a predefined character set;
      logic that performs a plurality of queries of a search content database, each of the queries referring to all records having a key which begins with a corresponding one of the strings, each of the queries producing a corresponding record set; and
      logic that adds a search results document to a collection when the corresponding record set has a non-zero size.

2. The system of claim 1, wherein the complete set of all strings is generated recursively.

3. The system of claim 1, the search indexer code further comprising logic that creates the search results document from the corresponding record set.

4. The system of claim 1, wherein each record in the corresponding record set includes a plurality of fields, the search indexer code further comprising logic that creates the search results document from at least some of the fields in the corresponding record set.

5. The system of claim 1, wherein the logic that adds further comprises logic that ranks the records in the corresponding record set and creates the search results document to include only the records having a rank higher than a predefined threshold.

6. The system of claim 1, wherein the logic that adds is performed if the search results document is not a duplicate of a document already present in the collection.

7. The system of claim 1, the search indexer code further comprising logic that distributes the collection to a content distribution network.

8. The system of claim 1, the system further comprising search retrieval code, the search retrieval code comprising logic that responds to a search query string by locating a search result document in the collection having a name that matches the search query string.

9. The system of claim 8, wherein the matching ignores a predefined portion at a beginning of the search query string.

10. The system of claim 8, wherein the search retrieval code responds to the search query string with an error code if no matching search result can be found.

11. A non-transitory computer-readable medium embodying a program executable in a computing device, the program comprising:
   code that generates a complete set of all strings, ranging from a string size of one to a predetermined maximum string size, having a plurality of characters limited to a predefined character set;
   code that performs a plurality of queries of a search content database, each of the queries referring to all records having a key which begins with a corresponding one of the strings, each of the queries producing a corresponding record set; and
   code that adds a search results document to a collection when the record set has a non-zero size.

12. The non-transitory computer readable medium of claim 11, wherein the complete set of strings is generated recursively.

13. The non-transitory computer readable medium of claim 11, the program further comprising code that ranks the records in the corresponding record set and creates the search results document to include only the records having a rank higher than a predefined threshold.

14. The non-transitory computer readable medium of claim 11, wherein the code that adds further comprises code that adds the search results document to the collection when the search results document is not a duplicate of a document already present in the collection.

15. The non-transitory computer readable medium of claim 11, wherein the complete set of strings is generated recursively.

16. A method, comprising the steps of:
   generating a complete set of all strings, ranging from a string size of one to a predetermined maximum string size, having a plurality of characters limited to a predefined character set;
   performing a plurality of queries of a search content database, each of the queries referring to all records having a key which begins with a corresponding one of the strings, each of the queries producing a corresponding record set; and
   adding a search results document to a collection when the record set has a non-zero size.

17. The method of claim 16, wherein the complete set of strings is generated recursively.

18. The method of claim 16, further comprising responding to a search query string by locating a search result document in the collection having a name that matches the search query string.

19. The method of claim 18, wherein the matching ignores a predefined portion at a beginning of the search query string.

20. The method of claim 18, wherein the responding further comprises responding to the search query string with an error code if no matching search result can be found.

* * * * *